United States Patent [19]

Tsukayama et al.

[11] Patent Number: 4,763,397
[45] Date of Patent: Aug. 16, 1988

[54] DEPRESSION STAKING PROCESS

[75] Inventors: Robert H. Tsukayama, Southfield; Roger E. Abitz, Northville, both of Mich.

[73] Assignee: Douglas & Lomason Company, Farmington Hills, Mich.

[21] Appl. No.: 943,121

[22] Filed: Dec. 17, 1986

[51] Int. Cl.$^4$ .................. B21D 39/00; B23P 11/00
[52] U.S. Cl. .................... 29/509; 29/522.1; 49/460; 52/716; 264/249; 428/31
[58] Field of Search ............. 52/287, 716–718, 52/743, 716, 717.1; 411/81, 82, 258, 377, 501, 502, 504; 29/509, 469.5, 527.1, 458, 522 R; 293/1; 264/249; 428/31; 49/460, 506, 492

[56] References Cited

U.S. PATENT DOCUMENTS

| | | | |
|---|---|---|---|
| 1,690,240 | 11/1928 | Norcross | 29/522 UX |
| 2,049,501 | 8/1936 | Herron | 52/717 |
| 2,050,993 | 8/1936 | Bush | 29/522 R X |
| 3,122,274 | 2/1964 | Quinche | 264/249 X |
| 3,308,225 | 3/1967 | Wells | 264/249 |
| 3,419,297 | 12/1968 | Diepenhorst et al. | 264/249 X |
| 3,458,618 | 7/1969 | Burns et al. | 264/249 |
| 3,471,355 | 10/1969 | Truesdell et al. | 428/31 X |
| 3,591,996 | 7/1971 | Shanok | 52/716 |

FOREIGN PATENT DOCUMENTS 172176  2/1952  Austria ........................ 264/249

Primary Examiner—Charlie T. Moon
Attorney, Agent, or Firm—Harness, Dickey & Pierce

[57] ABSTRACT

A method and apparatus for bonding two articles and in particular a metal trim strip to a thermoplastic article such as is used for automotive decorative window trim. The thermoplastic article includes a raised ridge portion which serves to provide means for accurately aligning the metal trim strip on the thermoplastic article. A plurality of holes are formed through the ridge portion at spaced locations along its length. The metal trim strip is preferably "C-shaped" in cross-section so as to define a channel having a restricted opening for receiving the raised ridge portion of the thermoplastic article. A controlled flow of hot air is directed into the holes of the thermoplastic article to plasticize a controlled portion of the thermoplastic material surrounding the holes. A stake is then projected into the plasticized material to displace the plasticized material into the channel portions of the metal strip. Upon return of the displaced thermoplastic material to a rigid state, the two articles are firmly and accurately bonded together. The resulting trim piece has a flush rear surface which facilitates proper installation of the trim piece on the vehicle body.

8 Claims, 1 Drawing Sheet

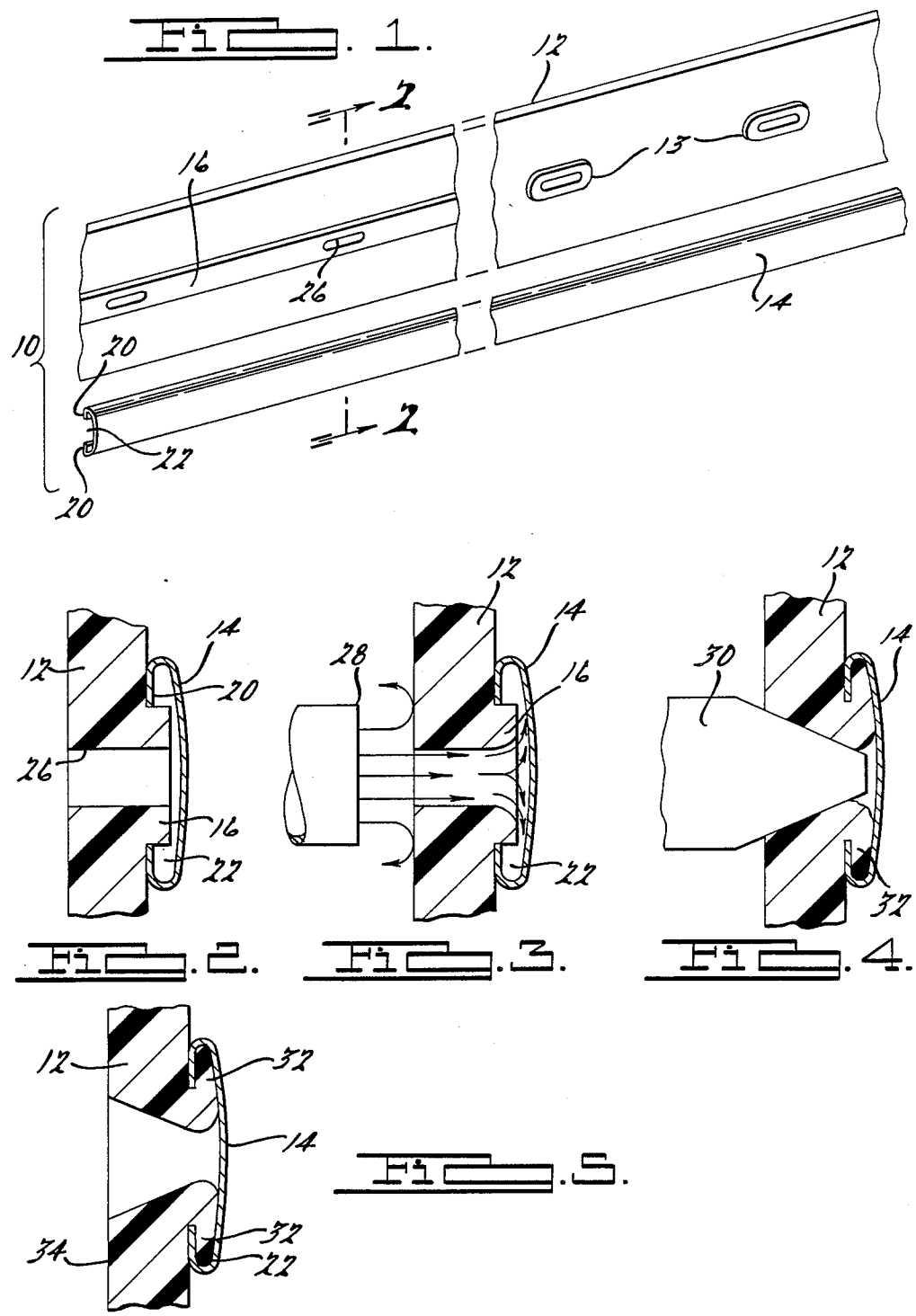

DEPRESSION STAKING PROCESS

BACKGROUND AND SUMMARY OF THE INVENTION

This invention relates to a method and apparatus for bonding two articles and, more particularly, to a method of and apparatus for heat bonding a thermoplastic article to another article such as automotive decorative trim.

Automotive subassemblies often consist of molded plastic pieces to which decorative trim is attached. The trim pieces are often chrome-plated metal strips designed to accent or highlight curves and features of the automobile. The articles to which the chrome trims are attached comprise thermoplastic molded substrates such as window inserts which cover seams in the automotive body or act as weatherproofing.

Previously, the method most commonly used for attaching chrome trim to thermoplastic articles consisted of fastening a post to the trim article, projecting the post through an aperture in the plastic article, and crimping or displacing a portion of the post projecting through the thermoplastic article to prevent withdrawal of the post from the thermoplastic article. Generally, the decorative trim article for such applications is shaped to define a channel on the backside of the trim. Thermoplastic 'buttons' are provided which comprise a stem portion with integral discs centered at one end of the stem so as to resemble thumb tacks. The disc portions of the buttons are slidably inserted into the channel of the trim so that the stems of the buttons projects outwardly from the channel. The buttons must be properly positioned along the trim channel to assure that the stems of the buttons are aligned with the precast holes in the thermoplastic article. Generally, this is accomplished by an operator placing tape over the buttons to hold them in their proper place along the trim channel. The trim is aligned with the plastic articles, pressed together so that the stems project through the plastic article, and the stems are displaced or crimped to prevent withdrawal.

There are several disadvantages to this known method. Trim strips having non-uniform widths require different size buttons which must be inserted into the channel of the trim in the proper sequence. In addition, the requirement of multiple-size buttons entails the concurrent need to inventory buttons of various sizes. Considerable operator time is spent in selecting the proper button, comparing the stem diameter to the hole in the plastic article, taping it in place for proper alignment of the two articles, and finally crimping them in position. Another disadvantage of the known method is that the stems are subject to breakage during cold weather due to brittleness.

Lastly, use of the known method frequently results in an uneven backside on the thermoplastic article of the finished trim piece caused by the staking of the stem or the displacement of a portion of the thermoplastic substrate itself. The resulting uneven surface on the backside of the article causes poor adherence of the finished trim piece to the body of the car. Accordingly, such trim pieces must be either reworked, scrapped, or an additional layer of material bonded to its back surface to compensate for the uneven surface.

Accordingly, it is the primary object of the present invention to provide an improved method of an apparatus for bonding two articles. A further object of the present invention is to provide a method by which two articles are bonded without the use of separate fasteners. Another object of the present invention is to provide a method of bonding two articles together which leaves a flat backing surface for subsequent adhesion to an automobile. Yet another object of the present invention is to provide a method for bonding two articles which results in accurate alignment of the two articles after bonding.

The above objects of the present invention are achieved by providing a thermoplastic article and an article with flanges defining a channel and then bonding the two articles together by displacing a portion of the thermoplastic material into the channel of the second article.

According to one embodiment to the present invention, a channel defining surface on the plastic article allows rapid and accurate alignment of the second article with the first article. A controlled flow of hot air is directed at the surface of the thermoplastic material to plasticize a controlled portion thereof. A stake contacts and displaces the plasticized portion of the first article into the channel of the second article. This process results in a greater overlap of displaced material in the bond area than the current processes. Upon return of the thermoplastic material to a rigid state, the two articles are firmly and accurately bonded. Separation forces are distributed by the bond over a wider area, thus reducing the possiblity of separation. Total process cycle time for bonding the two articles is approximately fifteen seconds as opposed to several minutes under the known procedure.

From the subsequent descriptions of the preferred embodiments and the appended claims taken in conjunction with the accompanying drawings, additional benefits and advantages of the present invention will become apparent to those skilled in the art to which this invention relates.

BRIEF DESCRIPTION OF THE DRAWINGS

FIG. 1 is a perspective view showing the two articles to be bonded in an as yet unbonded state;

FIG. 2 is a cross-sectional view taken along line 2—2 of FIG. 1 showning the two articles in an aligned state;

FIG. 3 is a cross-sectional view of the two articles in an aligned state during the plasticizing portion of the process;

FIG. 4 is a cross-sectional veiw of the two articles during the displacement portion of the process; and FIG. 5 is a cross-sectional view of the two articles in a bonded state.

DETAILED DESCRIPTION OF THE PREFERRED EMBODIMENTS

FIG. 1 illustrates an expanded view of an article to be formed in accordance with the present invention and is designated with reference numeral 10. Generally, the article is of the type used in the automotive industry to cover and fill the seams surrounding the window of an automobile. The article includes a thermoplastic base 12 and a second article 14, usually a chrome or metallic strip used for decorative purposes.

The thermoplastic article 12 includes an integral raised portion 16 comprising a continuous strip running the entire length of the article 12. Alternatively, the thermoplastic article 12 may be provided with a plurality of intermittently spaced raised portions 13 instead of the continuous strip. The raised portion 16 has a plurality of intermittently spaced apertures 26 formed therein. Alternatively, the apertures 26 may comprise recesses which project substantially into but not completely through the thermoplastic article 12. The raised portion 16 enables alignment of the thermoplastic article 12 with respect to the second article 14 as well as providing the additional material necessary to securely bond the two articles together, as will be explained herein.

The second article, illustrated herein as a chromed metal strip 14, is generally channel shaped having its edges formed into flanges 20 defining a channel 22 along the backside of the metal strip. The distance between the flanges 20 is approximately equal to the width of the raised portion 16 of thermoplastic article 12 so that the metal strip 14 is readily located in the proper position on the thermoplastic article 12.

Turning to FIG. 2, a cross-sectional view of the metal strip 14 properly positioned on the raised portion 16 of thermoplastic article 12 is shown. Once the metal strip 14 is accurately aligned on the thermoplastic article 12, a portion of the thermoplastic article 12 adjacent the holes or recesses 26 is plasticized by one of several alternative means.

Referring to FIG. 3, in the preferred embodiment, a hot air nozzle 28 directs a stream of warm air through the aperture 26 so as to warm and, hence, plasticize the raised portion 16 surrounding the aperture 26. The apertures 26 facilitate the distribution of heat through the raised portions 16 so that a controllable amount of material is plasticized. The extent to which the raised portion 16 surrounding the aperture 26 needs to be plasticized is determined by the amount of material that needs to be displaced to substantially fill the channel 22 as explained below. The temperature of the hot air stream is preferably between 300° and 600° F. Alternatively, the raised portion 16 adjacent the aperture 26 may be plasticized by treating it ultrasonically, or by other known means.

Turning now to FIG. 4, once a sufficient volume of the raised portion 16 has been plasticized, a stake 30 having a generally wedged-shaped profile with a head 32 wider than the aperture 26 is directed through the aperture 26 and into the plasticized volume of the raised portion 16. Projection of the stake 30 deforms and displaces the plasticized material so that it flows into the enlarged area of the channel 22 of the metal strip 14 substantially filling this area of the channel as shown at 32. The additional material presented by the raised portions 16 of thermoplastic article 12 insures that sufficient material is present to substantially fill the enlarged area of the channel 22 of the metal strip 14 without weakening the integrity of the thermoplastic article 12 adjacent the worked site.

Referring to FIG. 5, upon removal of the stake 30 and upon cooling of the thermoplastic article, the engagement of the flanges 20 of the metal strip 14 with the displaced portion 32 of thermoplastic article 12 creates a secure bond between the two articles, preventing separation of the metal strip 14 from the thermoplastic article 12. Optionally, a stream of cool air may be directed at the worked site after the staking operation to hasten the hardening or setting of the displaced portion 32. The process is repeated at all of the aperture 26 sites along the article 12 so that the metal strip 14 is securely bonded to thermoplastic article 12 along its entire length.

Significantly, it will be noted from the illustration of the completed trim in FIG. 5 that the backside 34 of the thermoplastic article 12 is flat and has not been deformed or distorted in any way by the bonding process according to the present invention. This is accomplished by insuring that the amount of thermoplastic material displaced during the staking process does not exceed the volume that can be received within the channel 22 of the metal strip 14. In this manner, the integrity of the backside 34 of the thermoplastic article is maintained, thereby insuring that the completed trim will fit flat against the body of the vehicle upon final assembly.

As an alternative to the two-step bonding process described above, the separate heating step may be eliminated and the staking element 30 heated so that upon insertion of the staking element 30 into the aperture 26 of the thermoplastic article 12, the raised portion 16 of material adjacent the aperture 26 is immediately plasticized and caused to flow into the channel 22 of the metal strip 12.

While the above description constitutes the preferred embodiments of the present invention, it will be appreciated that the invention is susceptible to modification, variation, and change without departing from the proper scope and fair meaning of the accompanying claims.

What is claimed is:

1. A method of attaching a first article to a second thermoplastic article comprising the steps of:
   forming a channel having a restricted opening in said first article;
   forming portions of raised material on said second article at locations where said first article is to be attached;
   placing said first article onto said second article so that said raised portions of said second article are received within the restricted opening of said channel in said first article;
   plasticizing said raised portions of said second article;
   positioning a stake having a wedge shape over a back side of said raised portions of said second article;
   displacing said plasticized material into the enlarged area of said channel by pressing said stake into said channel; and
   permitting said plasticized material to return to a rigid state so that said displaced material cannot be extracted through said restricted opening.

2. The method of claim 1 further including the step of forming apertures in the raised portions of said second article to facilitate controlled plasticization of said raised portions.

3. The method of claim 2 wherein the step of plasticizing said raised portions of material on said second article is accomplished by directing hot air into said apertures.

4. The method of claim 1 wherein the volume of material displaced into said channel is substantially equal to the available volume within said enlarged area of said channel.

5. A method of attaching a metal trim strip to a thermoplastic substrate comprising the steps of:
   forming the metal trim strip so as to define on the back side thereof an elongated channel having a restricted opening;
   forming portions of raised material on said thermoplastic substrate at locations where said metal trim strip is to be attached;
   placing said metal trim strip onto said thermoplastic substrate so that said raised portions of said thermoplastic substrate are received within the restricted openings of said channel in said metal trim strip;

plasticizing said raised portions of said thermoplastic substrate;

positioning a stake having a wedge shape over a back side of said raised portions of said thermoplastic substrate;

displacing said plasticized material into the enlarged area of said channel by pressing said stake into said channel; and permitting said plasticized material to return to a rigid state so that said displaced material cannot be extracted through said restricted opening.

6. The method of claim 5 further including the step of forming apertures in the raised portions of said thermoplastic substrate to facilitate controlled plasticization of said raised portions.

7. The method of claim 6 wherein the step of plasticizing said raised portions of material on said thermoplastic substrate is accomplished by directing hot air into said apertures.

8. The method of claim 5 wherein the volume of material displaced into said channel is substantially equal to the available volume within said enlarged area of said channel.

* * * * *